United States Patent [19]

Miyamoto et al.

[11] 4,453,945
[45] Jun. 12, 1984

[54] PROCESS FOR DYEING CELLULOSE FIBERS OF ITS UNION FIBERS WITH REACTIVE TRIAZINYL DYE QUATERNIZED WITH NICOTINIC ACID

[75] Inventors: Masakatsu Miyamoto, Ohmiya; Yoshiharu Suzuki, Tokyo; Masayoshi Ojima, Yono; Yutaka Iizuka, Urawa; Ryuzo Orita, Saitama; Tadashi Matsuo, Konosu, all of Japan

[73] Assignee: Nippon Kayaku Kabushiki Kaisha, Japan

[21] Appl. No.: 486,520

[22] Filed: Apr. 19, 1983

[30] Foreign Application Priority Data

Apr. 27, 1982 [JP] Japan .................................. 57-69584

[51] Int. Cl.³ ............................................. C09B 62/00
[52] U.S. Cl. ....................................... 8/543; 8/532; 8/549; 8/673; 8/681; 8/687; 8/682; 8/918
[58] Field of Search .................... 8/543, 549, 532, 673

[56] References Cited

U.S. PATENT DOCUMENTS 3,519,614  7/1970  Ponzini ................................. 8/543
4,129,736 12/1978  Begrich ................................ 8/549
4,264,321  4/1981  von der Eltz ........................ 8/532
4,277,246  7/1981  Lehinant et al. .................... 8/532
4,304,566 12/1981  von der Eltz et al. .............. 8/549

Primary Examiner—A. Lionel Clingman
Attorney, Agent, or Firm—Henry C. Nields

[57] ABSTRACT

The present invention relates to a process for dyeing cellulose fibers or its union fibers which is effected according to an exhaustion dyeing method using a reactive dye containing at least one s-triazinyl group having a group of the formula:

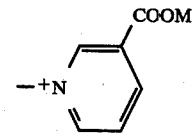

wherein M represents a hydrogen or an alkali metal, in an aqueous dyeing bath having a pH in the range of 4 to 10 and a dyeing temperature in the range of 110° C. to below 140° C.

8 Claims, No Drawings

PROCESS FOR DYEING CELLULOSE FIBERS OF ITS UNION FIBERS WITH REACTIVE TRIAZINYL DYE QUATERNIZED WITH NICOTINIC ACID

BACKGROUND OF THE INVENTION

The present invention relates to a process for dyeing cellulose fibers or its union fibers which is effected according to an exhaustion dyeing method using a reactive dye containing at least one s-triazinyl group having a group of the formula:

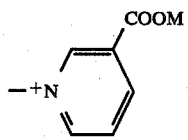

wherein M represents a hydrogen or an alkali metal, in an aqueous dyeing bath having a pH in the range of 4 to 10 and a dyeing temperature in the range of 95° C. to below 150° C. In dyeing cellulose fibers by an exhaustion dyeing method using reactive dyes which can be bound with the cellulose fibers, such as those containing reactive groups, for example, dichlorotriazinyl, monochlorotriazinyl, monofluorotriazinyl, fluorochloropyrimidinyl, dichloroquinoxazinyl, methylsulfonylpyrimidinyl, vinylsulfonyl or sulfatoethylsulfonyl groups, the pH of the dye bath is controlled generally to 10 or above by incorporating an acid binding agent or a substance which releases the acid binding agent upon heating, such as sodium carbonate, potassium carbonate, sodium hydroxide, potassium hydroxide, sodium metasilicate, trisodium phosphate, tripotassium phosphate, potassium pyrophosphate, sodium pyrophosphate, sodium bicarbonate or sodium trichloroacetate, either alone or in the form of a suitable mixture thereof. The dye bath further contains an electrolyte such as sodium chloride or sodium sulfate and the dyeing temperature is 100° C. or below.

In dyeing union fibers of cellulose and other fibers, particularly cellulose/polyester blends, with the above-mentioned reactive dyes, the dyes are used in combination with disperse dyes. In dyeing these blends with the two classes dyes in one step, several problems are raised. For example, the acid binding agent or a substance which releases acid binding agent required when the reactive dyes are used have defects that they coagulate or decompose various disperse dyes and the acceleration of hydrolysis of the reactive dyes is caused in an aqueous medium at a high temperature of, for example, 130° C. required in dyeing polyester textile materials. Whereby satisfactory results cannot be obtained. Therefore, in dyeing such cellulose/polyester blends, a two-bath method has been employed generally wherein one portion of the cellulose or polyester in the blends is first dyed and second the other fiber is dyed using another bath.

In dyeing cellulose/wool blends with the above-mentioned reactive dye and acid dye, a decontaminating agent is used, since the acid binding agent or the substance which releases the acid binding agent used for obtaining a pH of the dye bath suitable for fixing the reactive dye on cellulose damages the wool. The dyeing is effected by a one-bath or a two-bath process using the direct dye and acid dye.

In dyeing cellulose/polyacrylonitril blends, a two-bath method is employed using the reactive dye and basic dye or cationic dye or a one-bath two-step process wherein a anti-precipating agent is used is employed.

The present invention relates to an improvement in or relating to these dyeing methods.

It is known from the specification of Japanese Patent Publication No. 24323/1975 that a reactive dye containing an s-triazinyl group having a quaternary nitrogen atom derived from nicotinic acid is used for the exhaustion dyeing in the presence of an acid binding agent at a low temperature of 35° C. to 40° C.

SUMMARY OF THE INVENTION

After intensive investigations, the inventors have found that surprisingly a reactive dye containing at least one s-triazinyl group having a quaternary nitrogen atom derived from nicotinic acid is capable of dyeing cellulose fibers or its union fibers according to an exhaustion dyeing method in the absence of an acid binding agent or substance which releases acid binding agent, or in the presence of the acid binding agent or substance which releases acid binding agent in a small amount required for exhibiting a buffer effect for maintaining the dye bath at pH 4 to 10, particularly 6 to 8 at a dyeing temperature ranging from 95° to below 150° C., preferably 110° to 140° C. More particularly, the inventors have found that said reactive dye dyes sufficiently union fibers of cellulose and other fibers in the same depth of shade as that obtained in an ordinary dyeing process wherein a reactive dye is used in the presence of an alkali and that the reactive dye and disperse dye are capable of dyeing both polyester and cellulose in cellulose/polyester union fibers in the same bath without decomposing the disperse dye. The portion of polyester fiber is first dyed with the disperse dye according to a conventional high-temperature dyeing process (preferably at 120° to 135° C.) or a carrier dyeing process (at about 100° C.) and then the portion of cellulose fiber is dyed according to the process of the present invention using the same bath. Alternatively, the portion of cellulose fiber is first dyed according to the process of the present invention and then the portion of polyester fiber is dyed with the disperse dye in the same dyeing bath according to the above-mentioned process (a one-bath two-step process). The inventors have further found that surprisingly, even if the disperse dye and the reactive dye are contained in one and the same bath according to the present invention, the cellulose/polyester union fibers can be dyed simultaneously according to a one-bath one-step process without causing coagulation or decomposition of the disperse dye. As compared with the conventional two-bath, or one-bath two-step process, the process of the invention is far advantageous with respect to the saving of dyeing time, dyeing steps and energy. When the cellulose/wool union fibers are used for dyeing, both cellulose and wool could be dyed in the same color without damage to the wool by using the dye of the invention and an acid dye. When the cellulose/polyacrylonitril union fibers and used for dyeing, both cellulose and polyacrylonitril could be dyed in one and the same dye bath using the reactive dye of the invention and a basic dye or cationic dye.

As the reactive dyes containing at least one s-triazinyl group having a group of the formula:

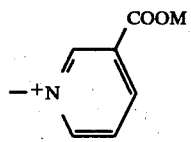

wherein M represents a hydrogen or an alkali metal, there may be mentioned dyes of the general formula:

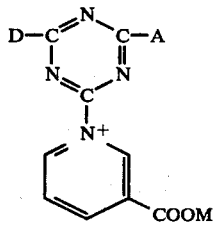

where D represents a chromophore containing at least one water-soluble group bonded with the triazine nucleus through

in which R represents hydrogen or a $C_1$–$C_3$ alkyl group, A represents an unsubstituted or substituted amino, alkoxyl or phenoxy group and M represents a hydrogen or an alkali metal, particularly sodium or potassium, dyes of the general formula:

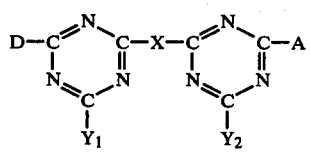

wherein both $Y_1$ and $Y_2$ represent

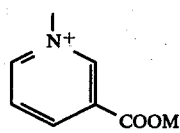

or one of $Y_1$ $Y_2$ represents

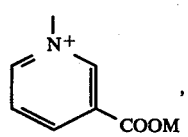

and the other represents a chlorine, fluorine or bromine, X represents a diamino residue bonded with the triazine nucleus through two amino groups, and D, A and M have the same meaning as above, dyes of the general formula:

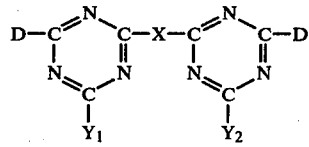

wherein D, X, $Y_1$ and $Y_2$ have the same meaning as above, dyes of the general formula:

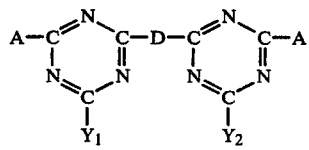

wherein D, A, $Y_1$ and $Y_2$ have the same meaning as above, and dyes of the general formula:

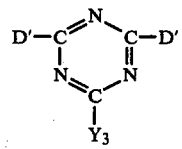

wherein D' represents a formazan chromophore, $Y_3$ represents a group of the formula:

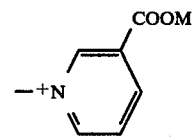

where M has the same meaning as above.

As the chromophore D in the above formulae [I] through [V], there may be mentioned, for example, azo, metal-containing azo, formazan, phthalocyanine and anthraquinone chromophors. They contain at least one water-soluble group such as a sulfonic or a carboxylic acid group.

As the unsubstituted or substituted amino, alkoxyl or phenoxy group A there may be mentioned the following groups: amino, alkylamino (e.g., methylamino, ethylamino, propylamino, butylamino, dimethylamino, diethylamino, methylethylamino, octylamino and dicyclohexylamino), hydroxyalkylamino (e.g., monoethanolamino and diethanolamino), cyanoalkylamino (e.g., β-cyanoethylamino and di-β-cyanoethylamino), β-sulfoethylamino, —HN—$CH_2CH_2SO_3H$, —NHCH$_2$COOH, anilino; anilino substituted with sulfo, chloro, lower alkyl, lower alkoxyl or nitrocarboxyl group (e.g., o-, m- or p-sulfoanilino, 2,5-disulfoanilino, o-, m- or p-toluidino, o-, m- or p-methoxyanilino, o-, m- or p-chloroanilino, 2-methyl-4-sulfoanilino, 2-methoxy-4-sulfoanilino, p-nitroanilino, 2-sulfo-4-methylanilino, 4-chloro-2-sulfoanilino, o-, m- or p-carboxyanilino, 2-carboxy-4-sulfoanilino), N-methylanilino, N-ethyl-4-chloro-anilino, alkoxyl (e.g., methoxy, ethoxy, propoxy and butoxy) alkoxyalkoxyl (e.g., methoxyethoxy, ethoxy-ethoxy and methoxypropoxy); phenoxy, phenoxy substituted with chloro, nitro, methyl, sulfo or carboxyl (e.g., o-, m- or p-chlorophenoxy, o-, m- or p-nitrophenoxy, o-, m- or p-sulfophenoxy and o-, m- or p-carboxyphenoxy), morpholino, piperidino and piperazino groups.

As the diamino residue X, the following groups may be mentioned: alkylenediamino (e.g., ethylenediamino, 1,3-propylenediamino or 1,6-hexylenediamino) 2-hydroxyl-1,3-propylenediamino and —NHCH$_2$CH$_2$OCH$_2$CH$_2$NH—, arylenediamino (e.g., 1,4-phenylenediamino, 1-methyl-2,6-phenylenediamino, 1,3-phenylenediamino, 4-sulfo-1,3-phenylenediamino, 4,6-disulfo-1,3-phenylenediamino, 2-sulfo-1,4-phenylenediamino, 2,5-disulfo-1,4-phenylenediamino, 5-carboxy-1,3-phenylenediamino, 2,5-dimethoxy-1,4-phenylenediamino, 1-N-methylaminoanilino, 1,2-phenylenediamino, 2,3,6-trimethyl-5-sulfo-1,4-phenylenediamino,

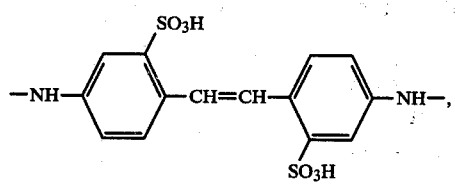

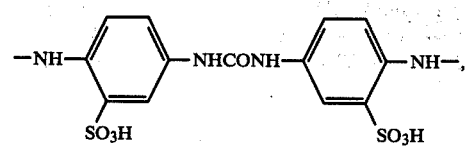

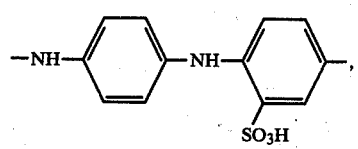

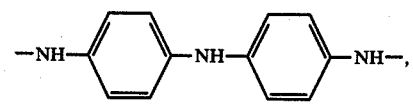

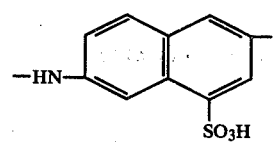

2-methyl-5-sulfo-1,3-phenylenediamino, 4-methyl-1,2-phenylenediamino,

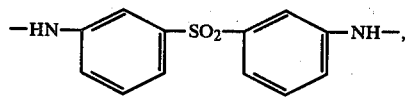

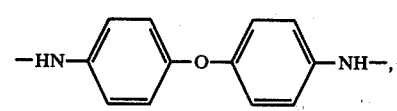

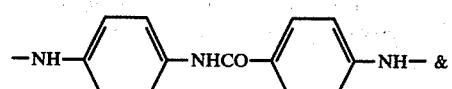 &

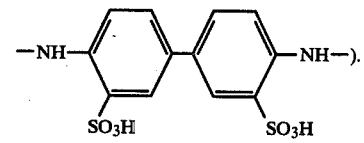

As M, there may be mentioned lithium, sodium or potassium.

The dyes of the above general formulae [I] to [V] may be obtained by reacting dyes of

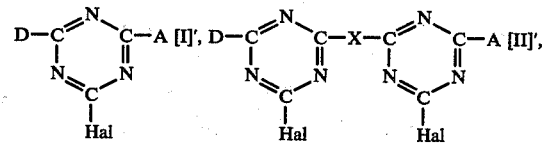

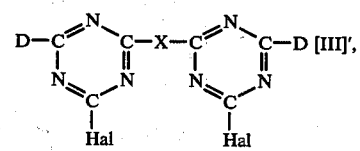

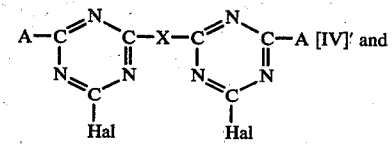

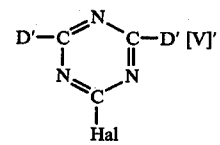

(wherein A, D, D' have the same meaning as above, Hal is F, Cl or Br)
with nicotinic acid or an alkali metal salt thereof, preferably, in an aqueous solution preferably at 45° to 110° C. at pH 5 to 9.

Preferred reactive dyes of the present invention include, which as in the form of free acid, dyes of the general formula:

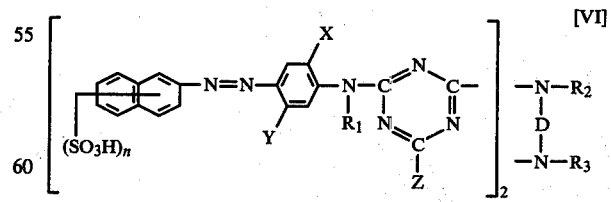

wherein X represents a hydrogen atom, a methyl or methoxy group, Y represents a hydrogen atom or a methyl, acetylamino or ureidoamino group, R$_1$, R$_2$ and R$_3$ represent each a hydrogen atom or a methyl group, Z represents

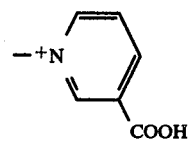

or at least one of two Zs in the molecule represents

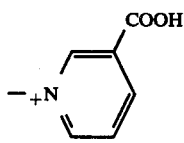

and the other represents —Cl, D represents

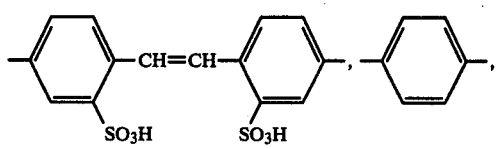

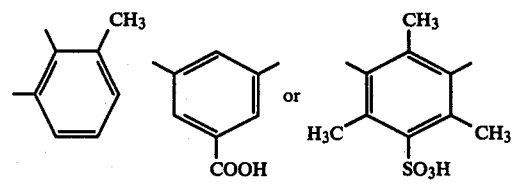

and n represents an integer of 1 to 3, with the proviso that when n is 3, D should not represent

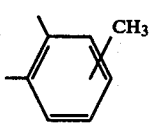

dyes of the general formula:

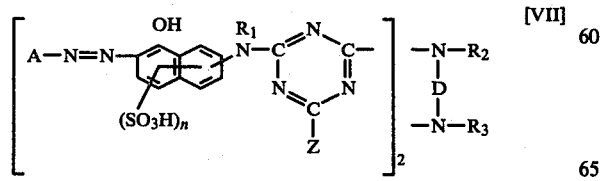

wherein A represents a benzene residue having 1 to 2 sulfonic and/or carboxylic acid groups or a naphthalene residue having 1 to 3 sulfonic acid groups, Z represents

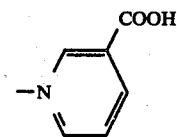

or at least one of two Zs in the molecule represents

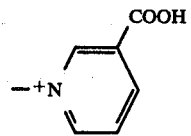

and the other represents —Cl, D represents

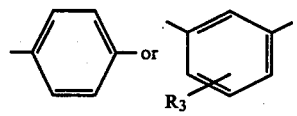

($R_3$ represents $CH_3$ or COOH) and n represents an integer of 1 to 3; and
dyes of the general formula:

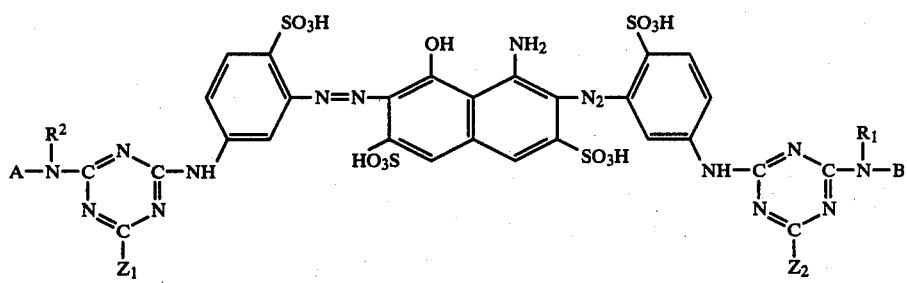

[VIII]

wherein $Z_1$ and $Z_2$ represent

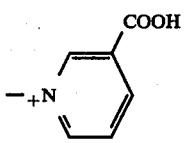

or at least one of $Z_1$ and $Z_2$ represents

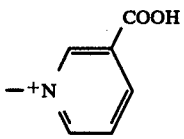

and the other represents —Cl, $R_1$ and $R_2$ represent each a hydrogen atom or a methyl group and A and B represent each an aromatic residue or hydrogen.

In the dyes of formula [VI], preferred are those wherein D represents

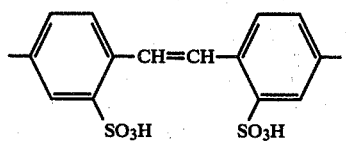

In the dyes of formula [VII], preferred are those wherein A represents

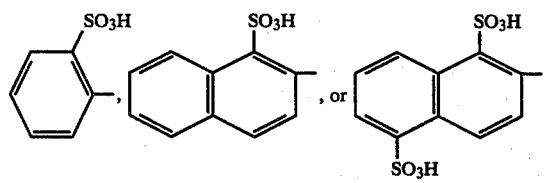

and D represents

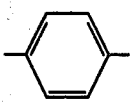

In the dyes of formula [VIII], particularly preferred are those wherein

represents

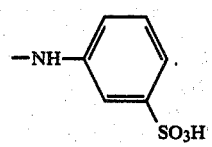

Preferred fibers usable in the present invention are cellulose fibers such as cotton, viscose rayon, cuproammonium rayon and hemp and union fibers of cellulose and other fibers such as cellulose-containing polyester, triacetate, polyacrylonitrile, acid modified polyacrylonitrile, polyamide, wool and silk. They may be used in any form such as filaments, loose fibers, hanks, and cloths.

In the process of the present invention, dyes required for dyeing fibers other than cellulose, such as disperse dyes, basic dyes, cationic dyes, acid dyes and metal-containing acid dyes described in "Colour Index" 3rd edition and its "Additions and Amendments" can be simultaneously incorporated in the dye bath to effect the dyeing.

In the process of the present invention, reactive dyes of the general formulae [I] to [V] wherein the group

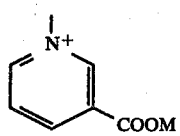

is replaced with a halogen atom such as chlorine, fluorine or bromine atom to form a halogeno-s-triazinyl group (hereinafter referred to as "precursor") may be incorporated in the dyeing bath together with nicotinic acid or an alkali metal salt thereof of the formula:

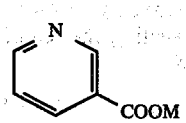

to form the dyes of the general formulae [I] to [V] to effect the dyeing. The amount of nicotinic acid or its alkali metal salt used is 0.5 to 10 mol, preferably 1.0 to 5 mol, per one gram-atom of the halogen in the halogeno-s-triazinyl group-containing reactive dyes (precursor).

According to the present invention, the dyeing is effected preferably as follows: an aqueous dyeing bath containing a dye of the general formulae [I] to [V] (or a precursor of the dye and nicotinic acid or its alkali metal salt), a dye for dyeing fibers other than cellulose, a cellulose or union fibers of cellulose and other fibers and, if necessary, preferably 1 to 150 g/l of an electrolyte such as sodium chloride or sodium sulfate is prepared. Then the dyeing is effected at 100° to 150° C. for 10 to 90 min. while keeping the pH of dye bath at 4 to 10.

The pH of the dye bath is maintained in the range of 4 to 10 in the present invention as described above. It is preferred, however, to control the pH in the range of 6 to 8 before the initiation of the dyeing and to maintain the same value until completion of the dyeing so as to obtain a high dyeing reproducibility. To keep the pH in the above-mentioned range during the entire course of the dyeing process, there may be incorporated in the bath a suitable substance which exhibits a buffer action in the aqueous dye bath, such as an acid, e.g. sulfuric acid, hydrochloric acid, carbonic acid, boric acid, phosphoric acid, acetic acid, tartaric acid or citric acid or its sodium, potassium or ammonium salt. They may be used either alone or in the form of a mixture of them.

The amount of the buffer agent(s) is advantageously 0.5 to 5.0 g/l.

In another embodiment of the present invention, the reactive dye (or the precursor and nicotinic acid or its salt), another dye for dyeing textile materials other than cellulose and the electrolyte are incorporated in the dyeing bath prior to the initiation of the dyeing or in the course of the dyeing. Further, a reduction inhibitor such as sodium m-nitrobenzenesulfonate, an anionic, nonionic or cationic levelling agent, retarding agent, dispersing agent, anti-precipitating agent or the like may be added thereto. The union fibers of cellulose may be dyed advantageously by a one-bath one-step method wherein the cellulose and the other fibers are dyed simultaneously as described above. In addition, a one-bath two-step method wherein one of the fibers of the union fiber is dyed first and then the other fibers of the union fibers are dyed in the same bath may be employed. Further, there may be employed a two-bath dyeing method wherein the cellulose-containing textile material is dyed by the dyeing process of the present invention in combination with another process for dyeing a material other than the cellulose using two different baths.

The dyeing machine used in the dyeing according to the present invention is not particularly limited and a machine capable of dyeing by an exhaustion method at a dyeing temperature of 100° to 150° C. may be used. Generally, a rotary dyeing machine, a jet dyeing machine, a cheese dyeing machine, a cake dyeing machine, an Obermaier-type dyeing machine, a winch dyeing machine and a jigger dyeing machine provided with a device capable of elevating the temperature to 100° to 150° C. are preferred.

DETAILED DESCRIPTION OF THE PREFERRED EMBODIMENTS

The following examples will further illustrate the present invention, wherein parts are given by weight unless otherwise stated.

EXAMPLE 1

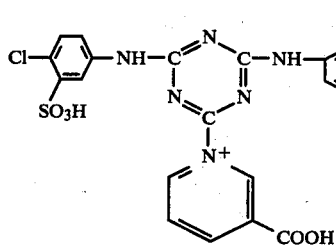

$\lambda$ max = 610 nm

A dye bath of pH 6 was prepared from 933.5 parts of water, 0.5 part of a nicotinic acid-substituted triazinyl reactive dye of the formula:

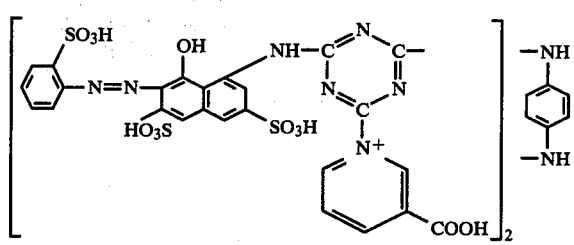

$\lambda$ max = 508 nm 1 part of Kayalon Polyester Light Red BL-SE (C.I. Disperse Red 164; a disperse dye of Nippon Kayaku Co.), 60 parts of $Na_2SO_4$, 1 part of sodium m-nitrobenzenesulfonate and 2 parts of a dispersing agent of an naphthalene-sulfonic acid/formalin condensate, a buffer agent comprising 1.2 parts of $KH_2PO_4$ and 0.8 part of $Na_2HPO_4 \cdot 12H_2O$. 50 parts of cotton/polyester blends were introduced into the dye bath, then temperature was elevated to 140° C. in 20 min and the dyeing was effected at this temperature for 60 min. After completion of the dyeing, the mixture was cooled slowly and the liquid was discharged at 80° C. The dyed blends was washed by adding 1000 parts of water followed by draining, subjected to soaping in 1000 parts of water containing 2 parts of an anionic surfactant and 2 parts of soda ash at 100° C. for 20 min, then washed with water and dried. Thus obtained dyed blends were deep in shade. Both polyester and cotton portions were dyed in the same color by a one-bath one-step process. The dyed blends had excellent fastness to wet and light.

EXAMPLE 2

The dye bath as in Example 1 except that it further contained 5 parts of Tetorosin K (methylnaphthalene type carrier of Yamakawa Yakuhin Co.). 50 parts of polyester/cotton (50/50) knitted cloth was introduced thereinto. The temperature was elevated to 100° C. under stirring and the dyeing was effected at this temperature for 60 min. After completion of the dyeing, the cloth was subjected to washing with water, soaping, washing with water and drying in the same manner as in Example 1. The obtained dyed blends was deep in shade for both polyester and cotton fibers by a one-bath one-step process using the carrier. The dyed cloth had excellent fastness to wet.

EXAMPLE 3

A dye bath was prepared from 808.5 parts of water, 3 parts of a dye of the formula (as free acid):

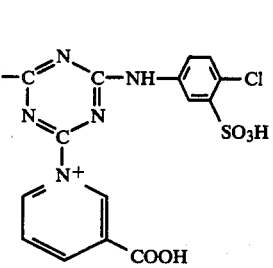

3 parts of Kayalon Polyester Navy Blue 2G-SF 200 (C.I. Disperse Blue 270; a disperse dye of Nippon Kayaku Co.), 1 part of sodium m-nitrobenzenesulfonate, 2 parts of a dispersing agent, a naphthalene-sulfonic acid/formalin condensate, 30 parts of $Na_2SO_4$ and 0.3 part of acetic acid and 2.2 parts of sodium acetate in amounts required for controlling the dye bath to pH 5.5 was prepared. A polyester/cotton (60/40) blends were introduced into the dye bath. The temperature was elevated to 130° C. in 15 min. and the dyeing was effected at this temperature for 30 min. Then, 150 parts of 20 wt. % aqueous $Na_2SO_4$ solution was added thereto and the dyeing was continued at this temperature for additional 30 min. After completion of the dyeing, the mixture was cooled slowly and the liquid was discharged at 90° C. The fabric was subjected to washing with water, soaping, washing with water and drying. Both polyester and cotton fibers were dyed in the same color, the dyed blends were deep navy blue in shade having excellent fastnesses.

EXAMPLE 4

An aqueous dyeing bath comprising 2 parts of a dye of the formula (as free acid):

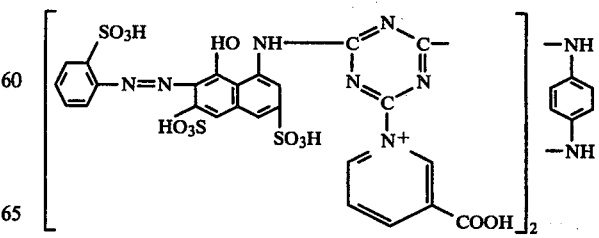

$\lambda$ max = 508 nm 60 parts of Na₂SO₄, 1 part of sodium m-nitrobenzenesulfonate, a buffer agent comprising 2 parts of Na₂HPO₄.12H₂O and 0.5 part of KH₂PO₄ and 934.5 parts of water was prepared. The dye bath had a pH of 7. 50 parts of a scoured, bleached, non-mercerized, knitted cotton cloth was introduced thereinto at room temperature. The temperature was elevated to 120° C. in 30 min. under stirring. The dyeing was effected at this temperature for 60 min. After completion of the dyeing, the pH of the bath was equal to that before the dyeing, i.e., 7. Then the fabric was washed with water, soaped with 1000 parts of water containing 2 parts of an anionic surfactant at 100° C. for 10 min, washed with water and dried. The dyed blends were deep bluish red in shade having an excellent fastness to wet. The dye was prepared as follows: 22 parts of a chlorotriazinyl dye of the formula (as free acid):

solution. The mixture was heated to 80° C. and stirred at this temperature for 10 hrs. Then the mixture was neutralized to pH 7 with a 10% aqueous HCl solution. 1 part of sodium m-nitrobenzenesulfonate, 80 parts of Na₂SO₄, a buffer agent comprising 2.43 parts of Na₂HPO₄.12H₂O and 0.08 part of KH₂PO₄ were added thereto and then water was added thereto to obtain the total volume of 100 parts. 50 parts of a bleached hemp cloth was introduced thereinto. The dyeing was effected at 100° C. for 60 min. The dyed blends were deep orange in shade having excellent fastness to wet. The pH of the dye bath was maintained at 8 before and after the dyeing.

EXAMPLE 6

A dye bath was prepared from 910.5 parts of water, 6 parts of a dye of the formula (as free acid):

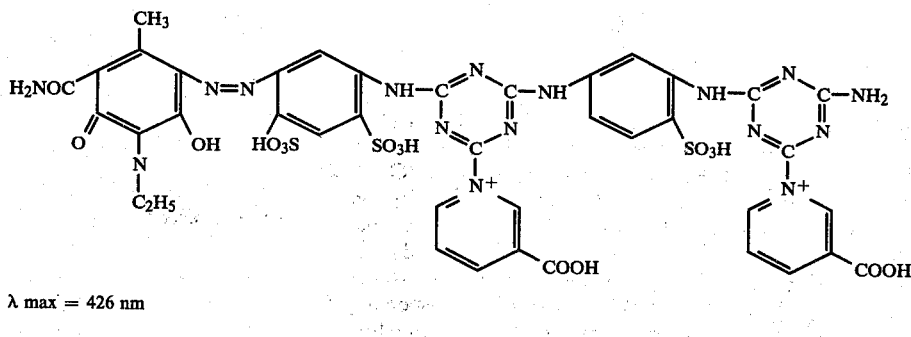

λ max = 426 nm

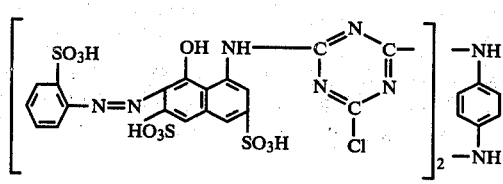

was dissolved in 300 parts of water. An alkaline aqueous solution of nicotinic acid obtained by dissolving 2 parts of sodium hydroxide and 6 parts of nicotinic acid in 70 parts of water was added to the former solution. The mixture was heated to 80° C. and stirred at this temperature for about 16 hrs. By salting out with NaCl followed by filtration and dry hrs, the intended nicotinic acid-substituted triazinyl reactive dye was obtained.

EXAMPLE 5

4.6 parts of a monochlorotirazinyl dye of the formula (as free acid):

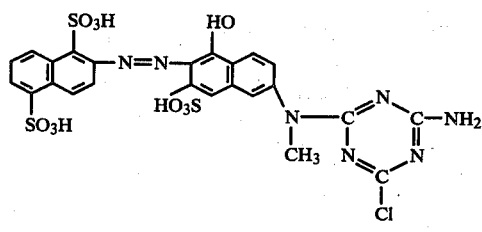

λ max = 492 nm was dissolved in 200 parts of water. An alkaline aqueous solution of nicotinic acid obtained by dissolving 0.38 part of sodium hydroxide and 1.18 parts of nicotinic acid in 15 parts of water were added to the former 80 parts of Na₂SO₄, 1 part of sodium m-nitrobenzenesulfonate, 2 parts of Na₂HPO₄.12H₂O and 0.5 part of KH₂PO₄. The dye bath had a pH of 7. An acryl/cotton (50/50) blends was introduced into the bath. The dyeing was effected at 100° C. for 60 min. The mixture was cooled slowly to 70° C. to complete the dyeing. Thereafter, the fabric was subjected to washing with water, soaping, washing with water and drying in the same manner as in Example 1. The dyed blends were deep greenish yellow in shade for the cotton in a pepper-and-salt having excellent fastness to light and wet.

EXAMPLE 7

A dye bath of pH 7 was prepared from 955.5 parts of water, 2 parts of a dye of the formula (as free acid):

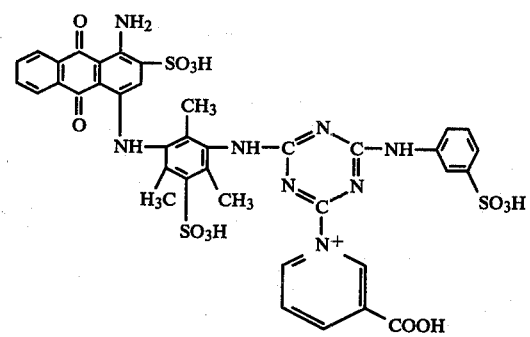

40 parts of Na₂SO₄, 2 parts of Na₂HPO₄.12H₂O and 0.5 parts of KH₂PO₄. 50 parts of a wool/cotton (50/50) yarn were introduced thereinto. The temperature was elevated to 100° C. in 20 min. and the dyeing was effected at this temperature for 40 min. Then acetic acid was added to the dye bath to control the pH to 4 and the dyeing was continued for additional 40 min. After completion of the dyeing, the yarn was washed with water, soaped in 1000 parts of a soaping bath containing 2 parts of a nonionic surfactant at 95° C. for 20 min, washed with water and dried. Both wool and cotton were dyed in the same color. The dyed yarn was deep vivid blue in shade having excellent fastness to light and wet.

EXAMPLE 8

A dye bath of pH 6 was prepared from 931.5 parts of water, 1 part of a dye of the formula (as free acid):

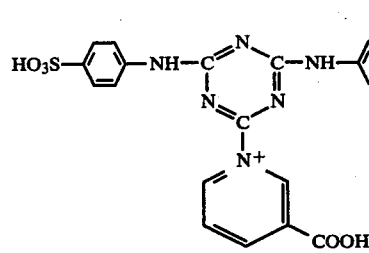

0.65 part of Kayalon Polyester Yellow BRL-S (C.I. Disperse Yellow 163; a disperse dye of Nippon Kayaku Co.), 0.11 part of Kayalon Polyester Rubine 3GL-S (C.I. Disperse Red 258; a disperse dye of Nippon Kayaku Co.), 0.4 part of Kayalon Polyester Navy Blue 2G-SF 200 (C.I. Disperse Blue 270; a disperse dye of Nippon Kayaku Co.), 1 part of sodium m-nitrobenzenesulfonate, 60 parts of $Na_2SO_4$, 2 parts of a dispersing agent comprising a sodium naphthalenesulfonate/formaldehyde condensate, 0.88 part of $CH_3COOH$ and 2.4 parts of $CH_3COONa.3H_2O$. 50 parts of a triacetate/cotton (70/30) blends were introduced thereinto. The temperature was elevated to 130° C. in 30 min. The dyeing was effected at this temperature for 60 min. After completion of the dyeing, the fabric was subjected to washing with water, soaping, washing with water and drying in the same manner as in Example 1. The dyed blends was heavy bluish green in shade having excellent fastness to wet.

EXAMPLE 9 TO 32

Dyes containing the group

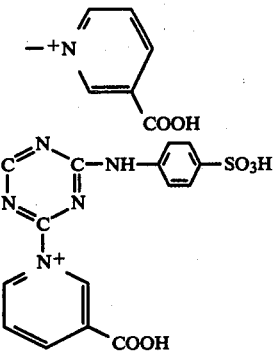

were prepared from dyes of formula:

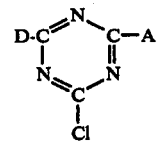

shown in the following table in the manner analogous to that in Example 4 and the dyeing was effected in the manner analogous to that in Examples 1 to 8.

| Example No. | Structural formula | Hue |
|---|---|---|
| 9 | ![structure] | Yellow |
| 10 | ![structure] | Yellow |
| 11 | ![structure] | Yellow |

-continued

| Example No. | Structural formula | Hue |
|---|---|---|
| 12 | | Reddish yellow |
| 13 | | Reddish yellow |
| 14 | | Yellow |
| 15 | | Yellow |
| 16 | | Orange |
| 17 | | Orange |
| 18 | | Scarlet |
| 19 | | Red |

-continued
| Example No. | Structural formula | Hue |
|---|---|---|
| 20 | 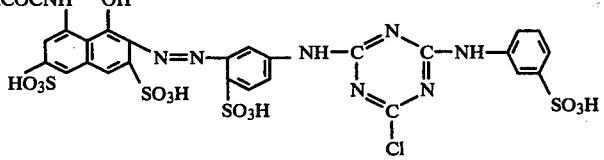 | Red |
| 21 | 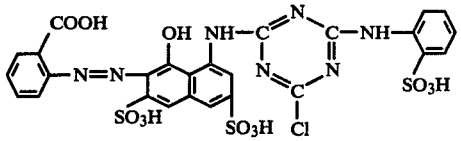 | Red |
| 22 | 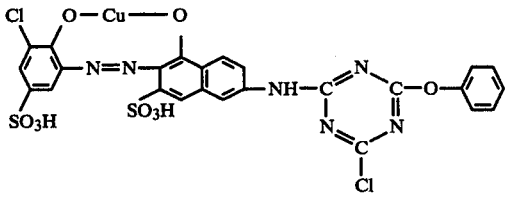 | Purple |
| 23 | 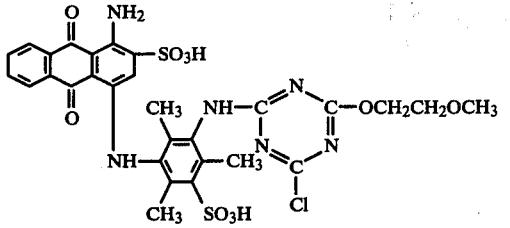 | Blue |
| 24 | 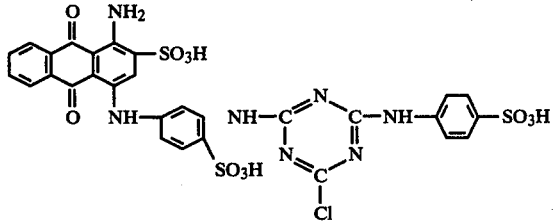 | Blue |
| 25 | 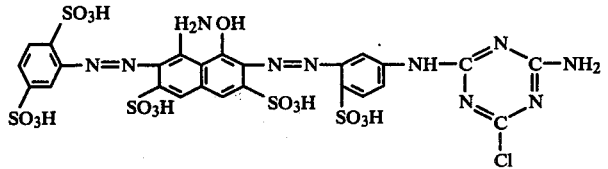 | Blue |
| 26 | 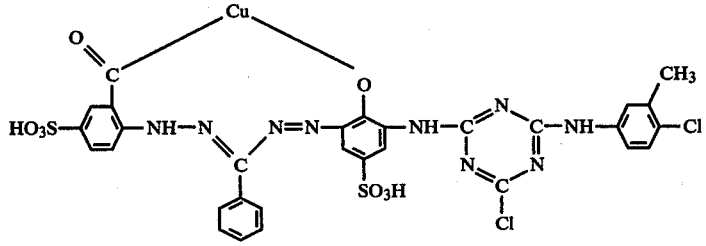 | Blue |

-continued
| Example No. | Structural formula | Hue |
|---|---|---|
| 27 | 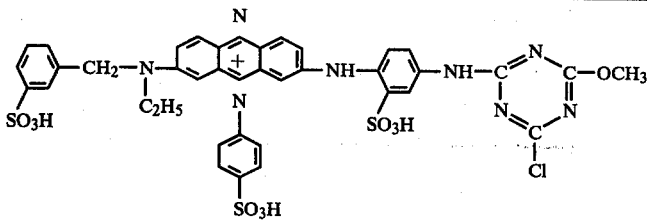 | Blue |
| 28 | 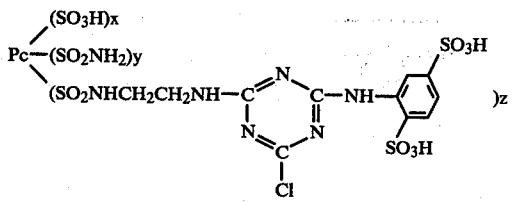<br>(Pc represents copper phthalocyanine and x = 1~3, y = 0~2, z = 1~3 and x + y + z = 4) | Blue |
| 29 | 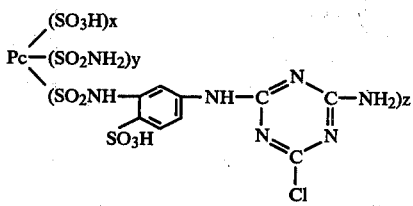<br>(Pc, x, y, z, have the same meaning as above) | Blue |
| 30 | 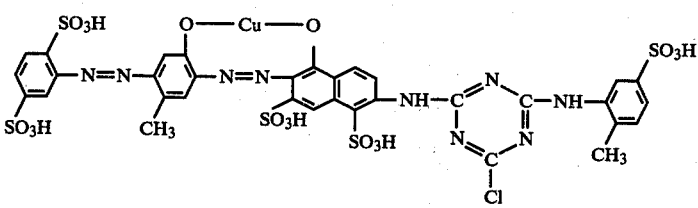 | Blue |
| 31 | 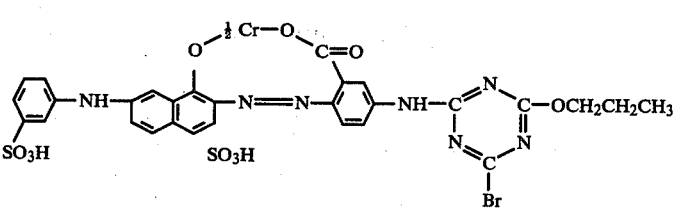 | Brown |
| 32 | 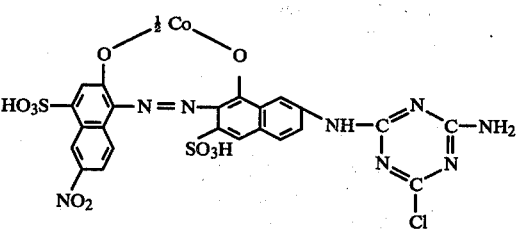 | Black |
EXAMPLE 33 TO 51
Dyes containing the group 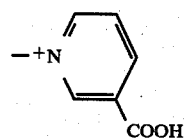 were prepared from dyes of the formula:

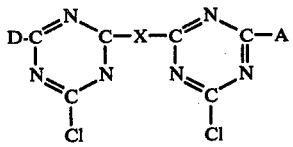

[II]' shown in the following table in the manner analogous to that in Example 4 and the dyeing was effected in the manner analogous to that in Examples 1 to 8.

| Example No. | D | X | A | Hue |
|---|---|---|---|---|
| 33 | (2,5-dichloro-4-sulfophenyl pyrazolone azo aminophenyl sulfo) | —NH—⟨C6H4(m)⟩—NH— | —NH$_2$ | Yellow |
| 34 | (4-sulfophenyl pyrazolone-COOH azo aminophenyl sulfo) | —NH—⟨C6H4(p)⟩—NH— | —NH—⟨C6H5⟩ | Yellow |
| 35 | (H-acid type: HO$_3$S, NO$_2$S, SO$_3$H naphthyl azo aminophenyl with NHCONH$_2$) | —NH—⟨C6H3(SO$_3$H)⟩—NH— | —NH—⟨C6H4-SO$_3$H⟩ | Reddish Yellow |
| 36 | (HO$_3$S naphthyl SO$_3$H azo aminophenyl NHCOCH$_3$) | —NH—⟨C6H2(SO$_3$H)(SO$_3$H)⟩—NH— | —NHCH$_2$COOH | Reddish yellow |
| 37 | (HO$_3$S naphthyl SO$_3$H azo OCH$_3$ aminophenyl NHCOCH$_3$) | —NHCH$_2$CH$_2$NH— | —NH—⟨C6H3(SO$_3$H)(COOH)⟩ | Reddish yellow |
| 38 | (SO$_3$H phenyl azo OCH$_3$ aminophenyl) | —NH—⟨C6H3(SO$_3$H)⟩—NH— | —NH—⟨C6H4-CH$_3$⟩ | Yellow |
| 39 | (pyridone: HO$_3$SCH$_2$C, CH$_3$, =O, N-C$_2$H$_5$, OH azo aminophenyl SO$_3$H) | —NH—⟨C6H2(SO$_3$H)(SO$_3$H)⟩—NH— | —NH—⟨C6H4-CH$_3$⟩ | Yellow |
| 40 | (SO$_3$H phenyl azo HO naphthyl NH— SO$_3$H, HO$_3$S) | —NH—⟨C6H2(SO$_3$H)(SO$_3$H)⟩—NH— | —NH—⟨C6H4-SO$_3$H⟩ | Red |

-continued

| Example No. | D | X | A | Hue |
|---|---|---|---|---|
| 41 | naphthalene with SO₃H, SO₃H substituents, azo-linked to naphthalene with OH, HO₃S, SO₃H, NH— | —NH—(C₆H₃Cl)—NH— | —N(CH₂CH₂OH)₂ attached via —NH | Red |
| 42 | anthraquinone with NH₂, SO₃H, and NH—(tetramethyl/SO₃H-phenyl)—NH— | —NHCH₂CH₂CH₂NH— | —NH—(2,5-disulfophenyl) | Blue |
| 43 | Cu-complexed azo with HO₃S-benzoate and sulfo-phenol with NH— (benzene pendant) | —NH—(2-methylphenyl)—NH— | —NH—(2,5-disulfophenyl) | Blue |
| 44 | bis-Cu complexed diazo biphenyl-dicarboxylate with bis-naphthol disulfonate and NH— | —NH—(2,5-disulfophenyl)—NH— | —NH—(2-carboxyphenyl) | Blue |
| 45 | Pc—(SO₃H)ₓ(SO₂NH₂)y(SO₂NHCH₂CH₂NH—)z | —NHCH₂CH₂NH— | —NHCH₂COOH | Greenish blue |
| 46 | Pc—(SO₃H)ₓ(SO₂NH₂)y(SO₂NH—(SO₃H-phenyl)—NH—)z | —NHCH₂CH₂OCH₂CH₂NH— | —O—C₆H₅ | Greenish blue |
| 47 | ½Cr complex with benzoate and azo-naphthol sulfonate with NH— | —NH—(cyclohexyl)—NH— | —NH—(3-sulfo-2-carboxyphenyl) | Brown |
| 48 | ½Cr complex, disazo naphthol with SO₃H groups and NH— | —NH—(4-methylphenyl)—NH— | morpholino —N(CH₂CH₂)₂O | Brown |

| Example No. | D | X | A | Hue |
|---|---|---|---|---|
| 49 | ![Cr complex with benzoate-azo-naphthalene, HO3S, NH] | −NH−⟨⟩−NH− with SO3H | −NH−⟨⟩−CH3 | Brown |
| 50 | ![Cr complex with disulfonated nitro-naphthalene azo naphthalene-NH] | −NH ⟨⟩ NH− with Cl | −NH−⟨⟩ | Black |
| 51 | ![Cu complex with benzoate-NH-N=C(Ph)-N=N-phenol-NH-SO3H] | −NH−⟨⟩−NH− with SO3H and SO3H | −NH−⟨⟩−SO3H | Blue |

EXAMPLES 52 TO 78

Dyes containing the group

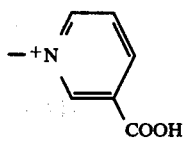

were prepared from dyes of the formula:

$$D-C\underset{N}{\overset{N}{=}}C-X-C\underset{N}{\overset{N}{=}}C-D \quad [III]'$$
with Cl on each triazine shown in the following table in the manner analogous to that in Example 4 and the dyeing was effected in the manner analogous to that in Example 1 to 8.

| Example No. | D | X | Hue |
|---|---|---|---|
| 52 | ![pyridone dye with CH3, HO3SH2C, C2H5, N=N-phenyl-SO3H-NH] | −NH−⟨SO3H⟩−CH=CH−⟨SO3H⟩−NH− | Yellow |
| 53 | ![o-sulfo-phenyl-N=N-hydroxynaphthalene-HO3S-NH] | −NH(CH2)6NH− | Orange |
| 54 | ![H3CO, SO3H phenyl-N=N-naphthol-HO3S-N(CH3)] | −NH−⟨⟩−O−⟨⟩−NH− | Scarlet |

-continued

| Example No. | D | X | Hue |
|---|---|---|---|
| 55 | 3-chloro-4-sulfophenyl-NH-C(OH)=C(-N=N-CH3,Cl)-N=N-(2-sulfo-5-amino)phenyl | —NH—(2-SO3H)C6H3—CH=CH—C6H3(2-SO3H)—NH— | Yellow |
| 56 | 4-sulfophenyl-N(-N=C(COOH))—C(OH)=C—N=N—(2-sulfo-5-amino)phenyl | —HNCH2CH2NH— | Yellow |
| 57 | 4-sulfophenyl-N(-N=C(COOH))—C(OH)=C—N=N—(2-sulfo-5-amino)phenyl | —NH—C6H3(SO3H)—NHC(O)NH—C6H3(SO3H)—NH— | Yellow |
| 58 | 4,6-disulfo-3-(NHCOCH3)-2-sulfonaphthyl-N=N-phenyl-NH— | —HNCH2CH2CH2NH— | Reddish yellow |
| 59 | 4,6-disulfo-3-(NHCONH2)-2-sulfonaphthyl-N=N-phenyl-NH— | —NH—C6H4—SO2—C6H4—NH— | Reddish yellow |
| 60 | 4,6-disulfo-3-(NHCONH2)-2-sulfonaphthyl-N=N-phenyl-NH— | —NH—C6H2(CH3)—NH— (ortho) | Reddish yellow |
| 61 | 2-carboxyphenyl-N=N-(8-amino-1-hydroxy-3,6-disulfo)naphthyl-NH— | —NH—C6H3(COOH)—NH— | Red |
| 62 | 2-carboxyphenyl-N=N-(8-amino-1-hydroxy-3,6-disulfo)naphthyl-NH— | —NH—C6H3(COOH)—NH— | Red |
| 63 | Cu complex: (2,5-disulfo-phenoxy)-N=N-(1-oxo-3-sulfo-6-amino)naphthyl-NH— | —NH—C6H3(SO3H)—NH— | Purple |
| 64 | Cu complex: (3-chloro-5-sulfo-phenoxy)-N=N-(1-oxo-3-sulfo-8-amino)naphthyl-NH— | —NH—C6H4—NH— (ortho) | Purple |

| Example No. | D | X | Hue |
|---|---|---|---|
| 65 | 2-methoxy-5-sulfophenyl-azo-1-hydroxy-3-sulfo-6-amino-naphthalene | —NH—(4-sulfo-phenyl)—CH₂—(2-sulfo-phenyl)—NH— | Scarlet |
| 66 | 2-sulfophenyl-azo-1-hydroxy-8-amino-3,6-disulfo-naphthalene | —NH—C₆H₄—NH— | Red |
| 67 | phenyl-azo-1-hydroxy-8-amino-3,6-disulfo-naphthalene | —NH—(2-sulfo-phenylene)—NH— | Red |
| 68 | 1-sulfo-2-naphthyl-azo-1-hydroxy-8-amino-3,6-disulfo-naphthalene | —NH—(1-sulfo-naphthylene-2,6)—NH— | Red |
| 69 | 8-acetylamino-1-hydroxy-3,6-disulfo-2-(3-sulfo-phenylamino-phenylazo)-naphthalene | —NH—(2,5-disulfo-phenylene)—NH— | Red |
| 70 | 2,5-disulfophenyl-azo-8-amino-1-hydroxy-naphthalene-(sulfo)-azo-(3-sulfophenylamino) | —NH—C₆H₄—NH— | Blue |
| 71 | Cu-complex bis-naphthyl-azo structure | —NH—(3-methyl-5-sulfo-phenylene)—NH— | Reddish blue |
| 72 | Cu-complex formazan-type structure | —NH—(2,5-disulfo-phenylene)—NH— | Blue |
| 73 | di-Cu-complex bis-azo biphenyl naphthyl structure | —NH—(3-sulfo-4-sulfo-phenylene)—NH— | Blue |

-continued

| Example No. | D | X | Hue |
|---|---|---|---|
| 74 | (structure with CH₃, H₂NOC, N=N, NH—, HO₃S, SO₃H, OH, N-C₂H₅) | —NH—⟨SO₃H⟩—CH=CH—⟨SO₃H⟩—NH— | |
| 75 | (naphthalene with SO₃H, SO₃H, N=N, OCH₃, NH—, NHCOCH₃) | —NH—⟨CH₃⟩—NH— & —NH—⟨CH₃⟩—NH— (1:1 mixture) | Reddish yellow |
| 76 | (naphthalene with SO₃H, SO₃H, N=N, NH—, NHCOCH₃) | —HN—⟨SO₃H⟩—CH=CH—⟨SO₃H⟩—NH— | Yellow |
| 77 | (naphthalene with SO₃H, SO₃H, SO₃H, N=N, NH—, NHCOCH₃) | " | Yellow |
| 78 | (Cu-complex structure with O—Cu—O, N=N, N=N, SO₃H, SO₃H, NH—, phenyl) | —NH—⟨SO₃H⟩—CH=CH—⟨SO₃H⟩—NH— | Blue |

EXAMPLES 79 TO 86

Dyes containing the group

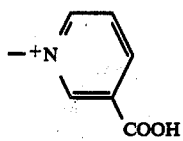

were prepared from dyes of the formula:

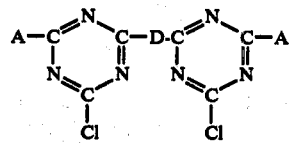

[IV]' shown in the following table in the manner analogous to that in Example 4 and the dyeing was effected in the manner analogous to that in Examples 1 to 8.

| Example No. | D | A | Hue |
|---|---|---|---|
| 80 | (structure with —NH—, CH₃, SO₃H, N, pyrazolone ring with OH, CH₃, N=N, HO₃S, NH—) | —NH—⟨SO₃H⟩ | Yellow |
| 81 | (structure with —NH—, N=N, SO₃H, naphthalene with HO, NH—, HO₃S, SO₃H) | —NH—⟨CH₃, SO₃H⟩ | Red |

-continued

| Example No. | D | A | Hue |
|---|---|---|---|
| 82 | | | Blue |
| 83 | | | Blue |
| 84 | | | Green |
| 85 | | | Navy blue |
| 86 | " | | Navy blue |

What we claim is:

1. A process for dyeing cellulose fibers or its union fibers which is effected according to an exhaustion dyeing method using a reactive dye containing at least one s-triazinyl group having a group of the formula:

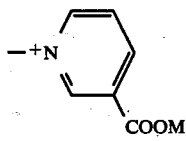

where M represents a hydrogen or an alkali metal, in an aqueous dye bath having a pH in the range of 4 to 10 and a dyeing temperature in the range of 110° C. to below 140° C.

2. A process according to claim 1 wherein the union fibers are cellulose/polyester union fibers.

3. A process according to claim 2 wherein the reactive dye, which is in the form of free acid of the formula:

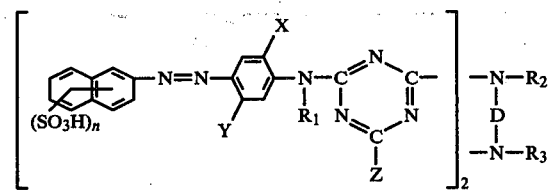

wherein X represents a hydrogen atom, a methyl or methoxy group, Y represents a hydrogen atom or a methyl, acetylamino or ureidoamino group, $R_1$, $R_2$ and $R_3$ represent each a hydrogen atom or a methyl group, Z represents

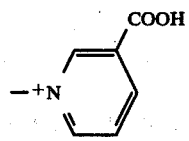

or at least one of two Zs in the molecule represents

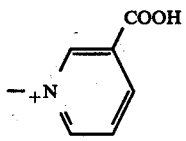

and the other represents —Cl, D represents

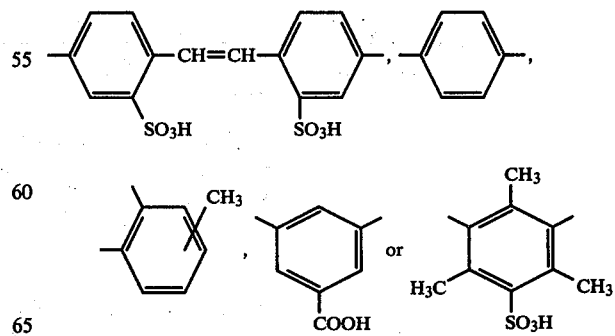

n represents an integer of 1 to 3; with the proviso that, when n is 3, D should not represent

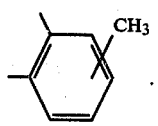

4. A process according to claim 2 wherein the reactive dye, which is in the form of free acid, has the following formula:

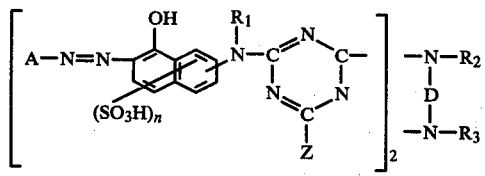

wherein A represents a benzene residue containing 1 or 2 sulfonic and/or carboxylic acid groups or a naphthalene residue containing 1 to 3 sulfonic acid groups, Z represents

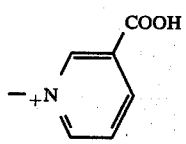

or at least one of two Zs in the molecule represents

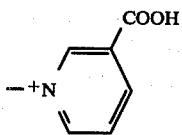

and the other represents —Cl, D represents

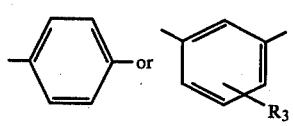

($R_3$ is $CH_3$ or COOH) and n represents an integer of 1 to 3.

5. A process according to claim 2 wherein the reactive dye, which is in the form of free acid, has the following formula:

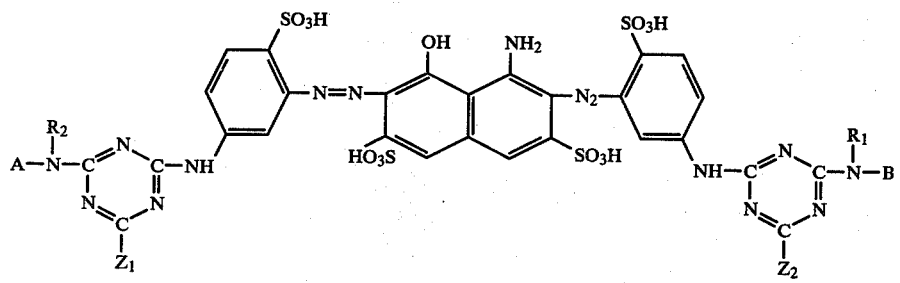

wherein both of $Z_1$ and $Z_2$ represent

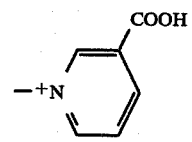

or one of $Z_1$ and $Z_2$ represents

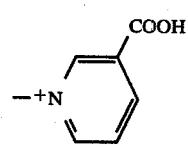

and the other represents —Cl, $R_1$ and $R_2$ represent each a hydrogen atom or a methyl group and A and B represent each an aromatic residue or —H.

6. The process according to claim 3 wherein D represents

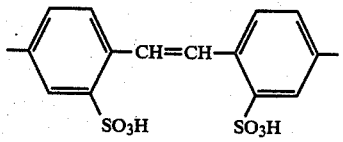

7. The process according to claim 4 wherein A represents

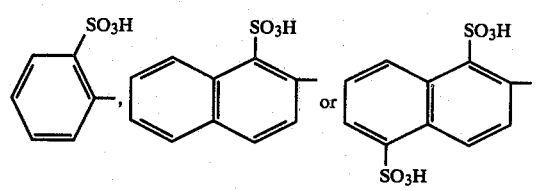

and D represents

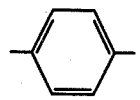

8. The process according to claim 5 wherein

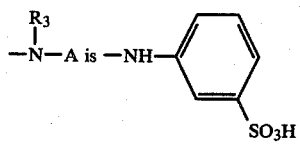

* * * * *